United States Patent [19]

Harada et al.

[11] Patent Number: 5,661,467
[45] Date of Patent: Aug. 26, 1997

[54] METHOD AND SYSTEM FOR TRANSFERRING SUPERVISORY RIGHT REQUIREMENT IN SUBMARINE CABLE COMMUNICATION NETWORK SYSTEM

[75] Inventors: Osamu Harada, Tokyo; Sachiko Hirano, Kanagawa, both of Japan

[73] Assignee: NEC Corporation, Tokyo, Japan

[21] Appl. No.: 486,205

[22] Filed: Jun. 7, 1995

Related U.S. Application Data

[63] Continuation-in-part of Ser. No. 838,400, Feb. 18, 1992, abandoned.

[30] Foreign Application Priority Data

Aug. 18, 1991 [JP] Japan ................................. 3-44035

[51] Int. Cl.$^6$ ............................................. H04Q 7/00
[52] U.S. Cl. .......................... 340/825.5; 340/825.51; 340/825.05
[58] Field of Search .......................... 340/825.5, 825.51, 340/825.56, 825.05, 825.72, 853.7; 370/85.2

[56] References Cited

U.S. PATENT DOCUMENTS

| | | | |
|---|---|---|---|
| 4,390,877 | 6/1983 | Curran | 340/825.72 |
| 4,410,983 | 10/1983 | Cope | 371/8 |
| 4,432,054 | 2/1984 | Okada et al. | 364/200 |
| 4,575,846 | 3/1986 | Yokomizo | 340/825.5 |
| 4,771,424 | 9/1988 | Suzuki et al. | 340/825.05 |
| 4,779,092 | 10/1988 | Takao | 370/85.2 |
| 4,782,483 | 11/1988 | Lambert et al. | 370/90 |
| 4,803,681 | 2/1989 | Takahashi | 370/85.2 |
| 4,807,223 | 2/1989 | Wells | 370/85.2 |
| 4,907,224 | 3/1990 | Scoles et al. | 370/85.2 |
| 5,065,153 | 11/1991 | Tomita et al. | 370/85.2 |
| 5,237,696 | 8/1993 | Best | 340/825.2 |

*Primary Examiner*—Michael Horabik
*Assistant Examiner*—Edward Merz
*Attorney, Agent, or Firm*—Foley & Lardner

[57] ABSTRACT

In transferring a supervisory right requirement signal in a submarine cable communication network system comprising a plurality of stations, a particular one of the stations being connected with other ones of the stations as opposite stations through submarine cables including repeaters, the particular station transmits a particular signal representative of the supervisory right requirement assigned thereto to the opposite stations through the submarine cables, respectively. Each of the opposite stations receives the particular signal as a received particular signal. Each of the opposite stations discriminates from the received particular signal that the particular signal is transmitted from the particular station. Then, each of the opposite stations returns the received particular signal to the particular station as a specific signal. The particular station receives the specific signal from each of the opposite stations as a received specific signal. When the particular station discriminates that the received specific signal is equal to the particular signal, the particular station acquires the supervisory right for the repeaters included in the submarine cables. The particular station can acquire the supervisory right without any back-up line when any fault occurs at a point in the submarine cable connecting between opposite stations.

4 Claims, 5 Drawing Sheets

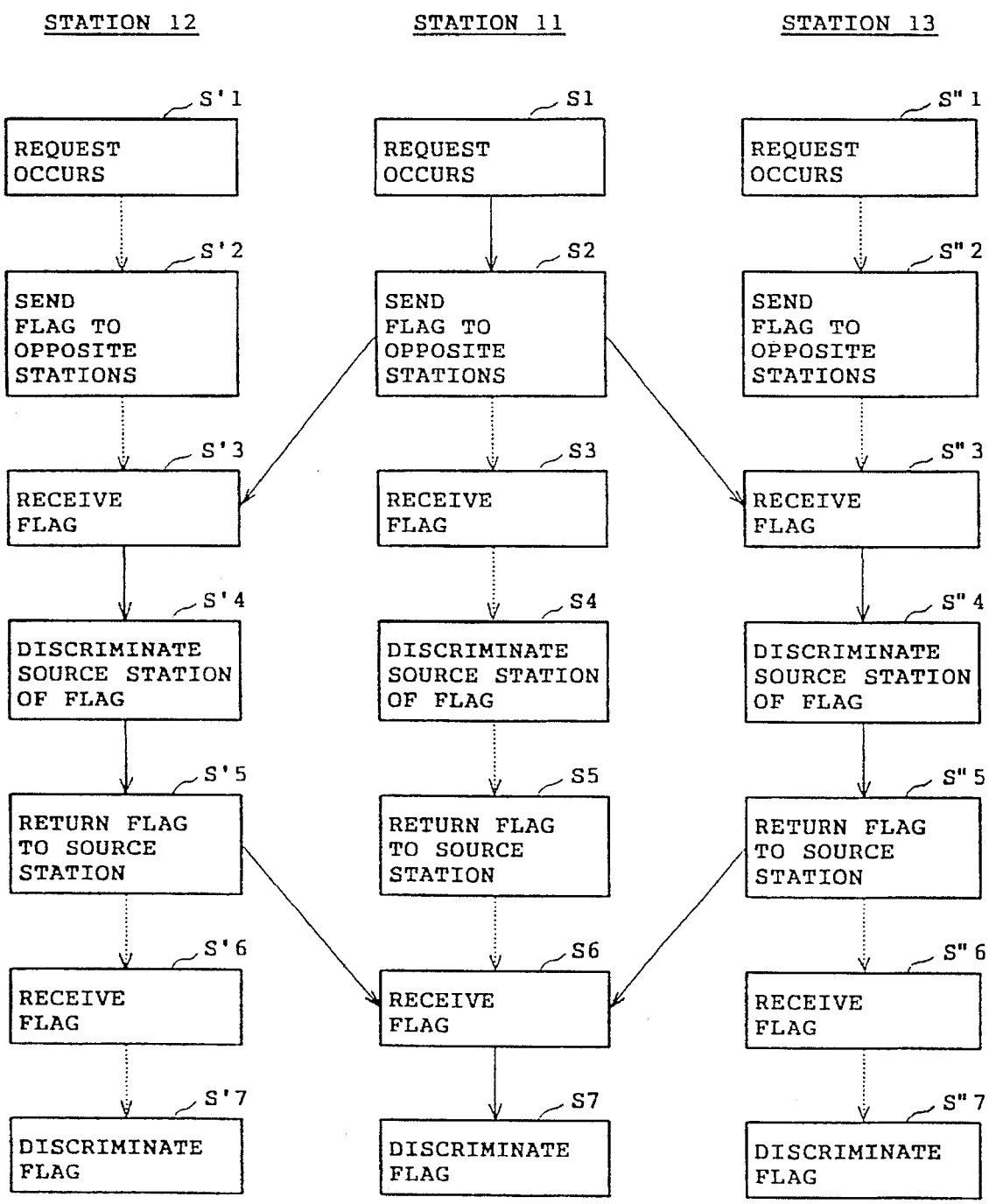

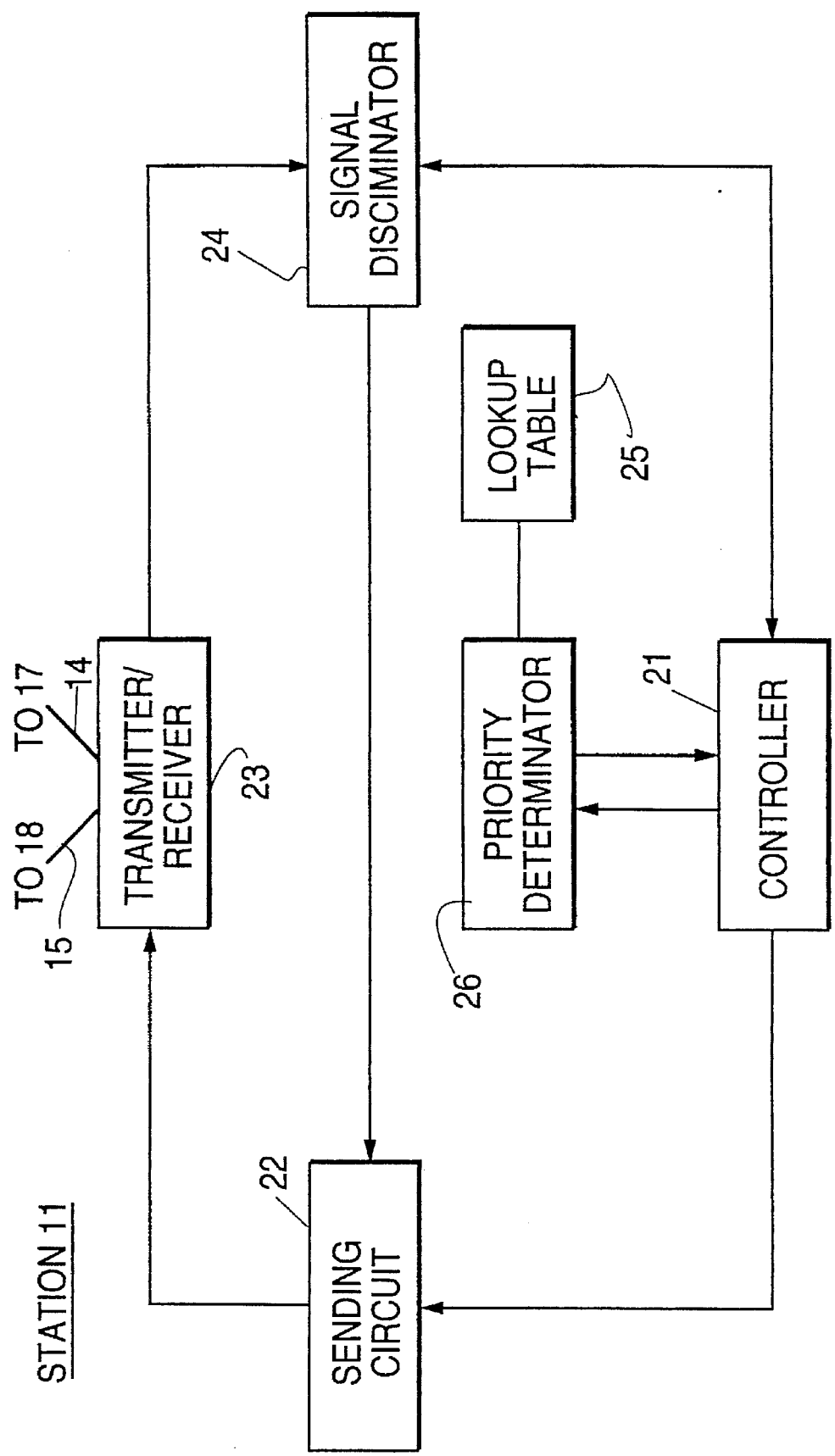

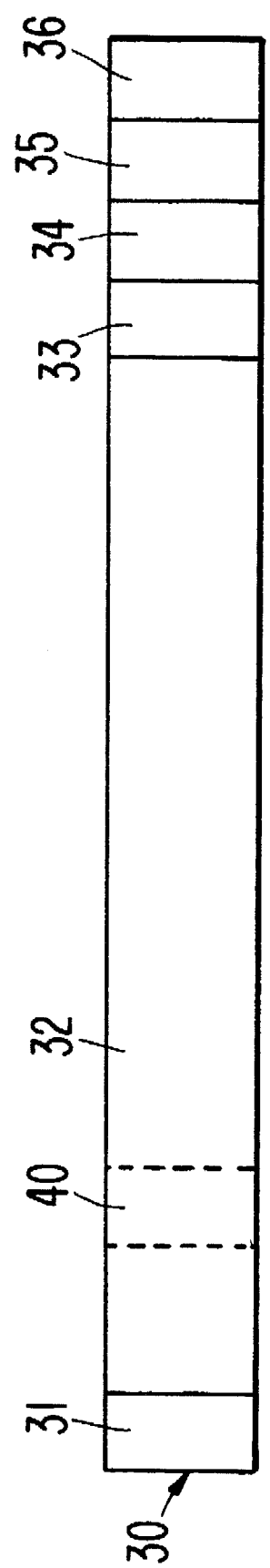

5,661,467

METHOD AND SYSTEM FOR TRANSFERRING SUPERVISORY RIGHT REQUIREMENT IN SUBMARINE CABLE COMMUNICATION NETWORK SYSTEM

This is a continuation in part of application Ser. No. 07/838,400, filed Feb. 18, 1992, now abandoned.

BACKGROUND OF THE INVENTION

The present invention relates to a method and a system for transferring a supervisory right requirement signal between stations in a submarine cable communication network system.

In a submarine cable communication network system, a plurality of stations are connected to each other through submarine cables including repeaters. In the system, each of stations periodically supervises repeaters connected thereto through submarine cables to trouble shoot the repeaters and/or to perform maintenance of the repeaters and the cables. In the supervisory action, each of the stations commands the repeaters to send to the station routine data or specific data measured in the repeaters. When some of the stations carry out the supervisory action for a single repeater at the same time, the supervising is confused due to collision of supervisory action. In order to avoid the confusion, a particular one of the stations can perform the supervisory action to repeaters after acquiring a supervisory right for repeaters by use of different signals representative of the supervisory right requirement individually assigned to the stations. The different signals are collectively referred to as a supervisory right requirement signal or a supervisory action flag signal. The supervisory right requirement signal usually has a digital data signal format and includes a station address assigned to the particular station requiring the supervisory right. During a time duration when the particular station holds the supervisory right and performs the supervisory action onto the repeaters, the other stations can neither acquire the supervisory right nor perform the supervisory action onto the repeaters. When the particular station completes the supervisory action onto the repeaters, the particular station abandons the supervisory right. Then, the supervisory right becomes neutral so that the supervisory right is left in the condition where any one of the stations is possible, as the particular station, to acquire the supervisory right by transmitting the supervisory right requirement signal.

Those stations are arranged in a circular loop for transferring the supervisory right requirement signal one after another as from one station to an adjacent station through submarine cables between adjacent stations. When a particular one of the stations desires to acquire the supervisory right, the particular station sends out the supervisory right requirement signal assigned thereto to the adjacent one of the stations. The supervisory right requirement signal is circulated through the loop and returns to the particular station. After confirmation of the return, the particular station acquires the supervisory right. Then, the particular station performs the supervisory action onto the repeaters and does not relay the supervisory right requirement signal from one to another of the stations adjacent to the particular station in the loop, even if the particular station would receive the supervisory right requirement signal from the adjacent one of the stations. Thus, any other stations cannot acquire the supervisory right. Upon completion the supervisory action, the particular station abandons the supervisory right and is in a condition to relay the supervisory right requirement signal from one to the other of the opposite adjacent ones of the stations.

In a conventional system using a transferring circular loop, it is impossible to transfer the supervisory right requirement signal when any fault occurs in the circular loop, for example, any one of cables is broken. As a result, any one of stations cannot acquire the supervisory right. Usually, a public line is used as a back-up line, but the supervisory right cannot be acquired by any stations if there is no public telephone line.

SUMMARY OF THE INVENTION

Accordingly, it is an object of the present invention to provide a method and a system for transferring the supervisory right requirement signal in the submarine cable communication network system which enables transfer of the supervisory right requirement signal between stations when any fault occurs in the circular loop and when there is no back-up line.

The present invention is directed to a method for transferring a supervisory right requirement signal in a submarine cable communication network system comprising a plurality of stations. A particular one of the stations is connected with other ones of the stations as opposite stations through submarine cables including repeaters. The method comprises steps of: the particular station transmitting a particular signal representative of the supervisory right requirement assigned thereto to the opposite stations through the submarine cables extending from the particular station; each of the opposite stations receiving the particular signal as a received particular signal and discriminating from the received particular signal that the particular signal being transmitted from the particular station to return the received particular signal to the particular station as a specific signal; and the particular station receiving the specific signal as a received specific signal and discriminating the received specific signal being equal to the particular signal to acquire the supervisory right for the repeaters included in the submarine cables.

According to the present invention, a system is obtained which is for transferring a supervisory right requirement signal in a submarine cable communication network system comprising a plurality of stations, a particular one of the stations being connected with other ones of the stations as opposite stations through submarine cables including repeaters. The particular station comprises: means for generating a request for sending the supervisory right requirement signal according to the requirement for supervision of the repeaters; first sending means coupled to the generating means and responsive to the request for sending a particular signal representative of the supervisory requirement assigned thereto to the opposite stations through the submarine cables; first receiving means coupled to each of the submarine cables for receiving a specific signal from each of the opposite stations as a received specific signal; and first discriminating means coupled to the first receiving means and responsive to the received specific signal for discriminating whether or not the received specific signal is equal to the particular signal, the particular station acquiring a right for supervision of the repeaters when the specific signal is equal to the particular signal. Each of the opposite stations comprises: second receiving means coupled to one or more submarine cables for receiving the supervisory right requirement signal incoming through the one or more submarine cables as a received signal; second discriminating means coupled to the second receiving means and responsive to the received signal for discriminating whether or not the received signal is sent from the particular station, the second discriminating means producing a return signal when the received signal is transmitted from the particular station; and second sending means coupled to the second discriminating means and responsive to the return signal for sending the received signal as the specific signal to the particular station.

According to the present invention, a station is also provided for use in a submarine cable communication network system. The station is connected to opposite stations through submarine cables including repeaters. The station comprises means for generating a request for sending the supervisory right requirement signal according to the requirement of supervision of the repeaters; sending means coupled to the generating means and responsive to the request for sending a particular signal representative of the supervisory right requirement assigned thereto to the opposite stations through the submarine cables; receiving means coupled to the each of the submarine cables for receiving the supervisory right requirement signal incoming through each submarine cable as a received signal; and discriminating means coupled to the receiving means and responsive to the received signal for discriminating whether or not the received signal is equal to the particular signal, the particular station acquiring a right for supervision of the repeaters when the received signal is equal to the particular signal, the discriminating means discriminating which one of the opposite stations is a source station of the received signal when the received signal is not equal to the particular signal and producing a return signal; the sending means coupled to the discriminating means and responsive to the return signal for sending the received signal to the source station.

BRIEF DESCRIPTION OF THE DRAWINGS

FIG. 3 is a flow chart illustrating operation of the system in FIG. 2;

FIG. 4 is a schematic diagram view of a modification of each of stations in a submarine cable communication network system shown in FIG. 1 according to another embodiment of the present invention; and FIG. 5 is a signal format of the supervisory right requirement signal used in the system including the station of FIG. 4.

DESCRIPTION OF PREFERRED EMBODIMENTS

Figure 1:
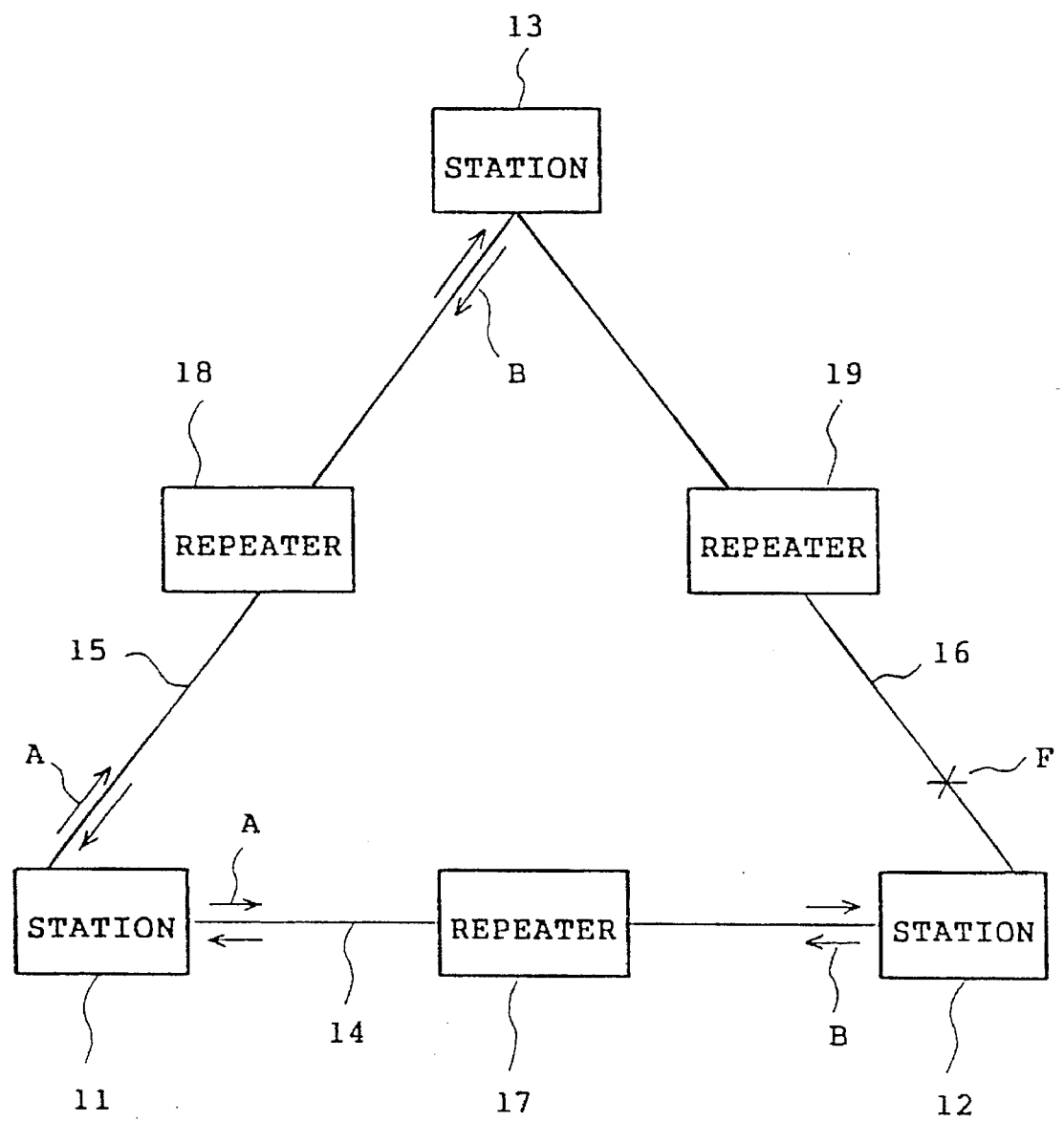
FIG. 1 is a schematic diagram of a submarine cable communication network system for illustrating a method for transferring a supervisory right requirement signal according to an embodiment of the present invention.

Referring to FIG. 1, the system shown therein comprises three stations 11, 12 and 13 which are connected by three submarine cables 14, 15 and 16 to each other to form a circular loop. The submarine cables 14, 15 and 16 include repeaters 17, 18 and 19, respectively, as shown in the figure.

According to a method of the present invention, when a particular one of the stations, for example the station 11 desires the supervisory right, the particular station 11 transmits a particular signal representative of the supervisory right requirement assigned thereto to all the opposite stations 12 and 13 through the submarine cables 14 and 15, respectively, as shown by arrows shown at A. It is needless to say that the particular signal A is a digital data signal having a data region for carrying an address assigned to the particular station.

Each of the opposite stations 12 and 13 receives the particular signal A as a received particular signal. Each of opposite stations 12 and 13 discriminates from the received particular signal that the particular signal is transmitted from the particular station 11. Then, each of the stations 12 and 13 returns the received particular signal to the particular station 11 as a specific signal as shown by arrows shown at B, when each of the opposite stations 12 and 13 accepts that the particular station acquires the supervisory right.

The particular station 11 receives the specific signal B from each of the stations 12 and 13 as a received specific signal. When the particular station 11 discriminates that the received specific signal is equal to the particular signal, the particular station 11 acquires the supervisor right for the repeaters 17 and 18 included in the submarine cables 14 and 15. According to the method, the particular station 11 can acquire the supervisory right without any back-up line when any fault occurs at point F in the submarine cable 16 connecting between stations 12 and 13.

When the opposite station 12 receives the particular signal during a time period when it has the supervisory right, the opposite station 12 does not send out a specific signal to the particular station 11. Accordingly, the particular station 11 does not receive the specific signal from the opposite station 12, so that the particular station 11 cannot acquire the supervisory right.

When the other opposite station 13 does not send out a specific signal to the particular station 11 for similar reasons, the particular station 11 also cannot acquire the supervisory right.

After acquiring the supervisory right, the particular station 11 performs the supervisory action to the repeaters 17 and 18. When the particular station 11 completes the supervisory action, it abandons the supervisory right. Thus, the supervisory right is in a neutral condition and can be newly acquired by any one of stations 11, 12, and 13 which desires the supervisory right.

In a case where each of stations 12 and 13 desires to acquire the supervisory right, it sends out, as the particular station, the particular signal to the other stations and can acquire the supervisory right in a similar manner as described above.

Figure 2:
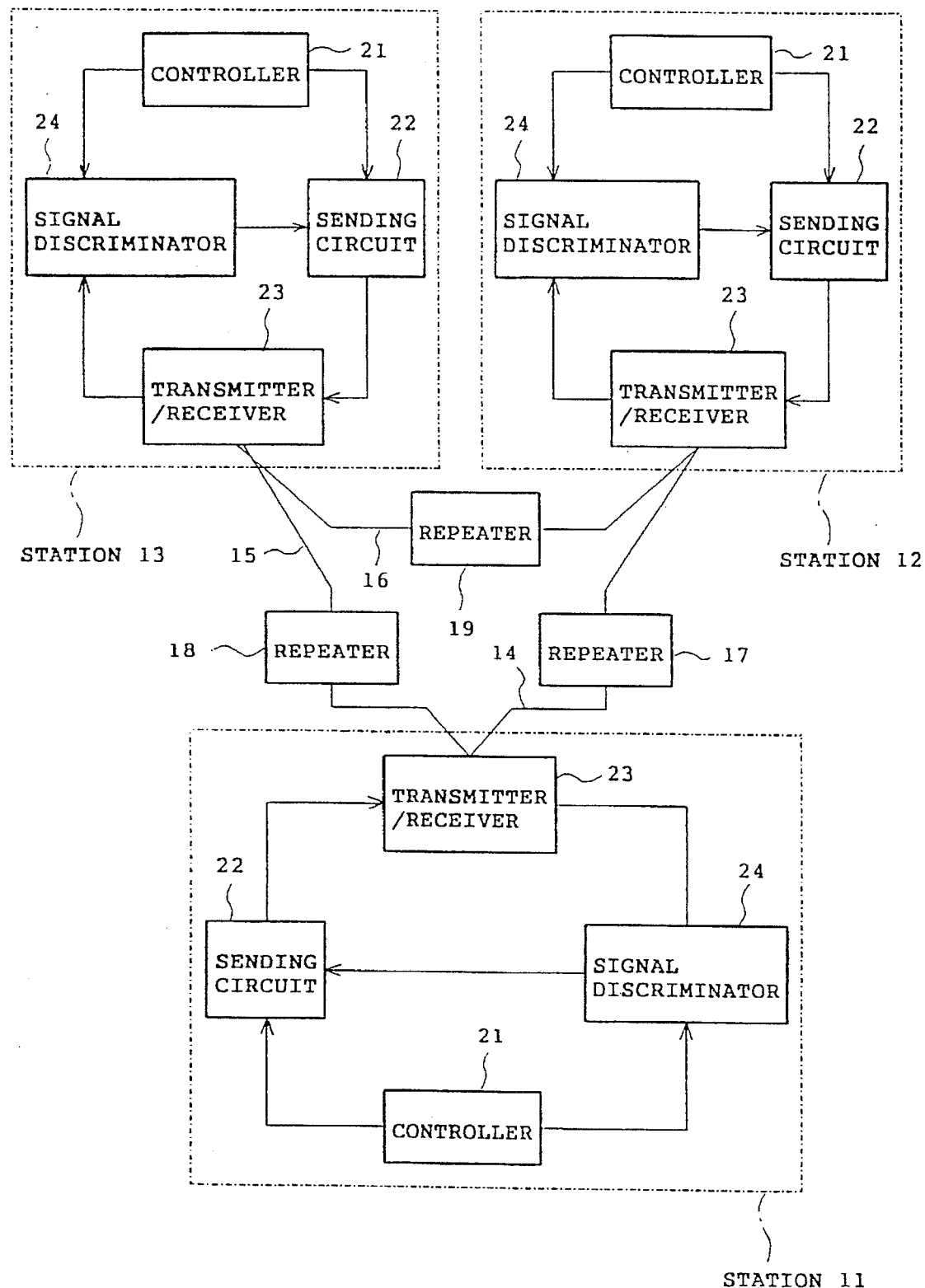
FIG. 2 is a schematic diagram view of the submarine cable communication network system comprising the supervisory right requirement signal transferring system according to one embodiment of the present invention.

Referring to FIG. 2, the system of FIG. 1 is shown in detail. As shown in the figure, stations 11, 12 and 13 are arranged in the similar structure. Accordingly, station 11 is described in detail and structures of other stations 12 and 13 are not described but are illustrated by use of the same reference numbers in station 11.

Station 11 comprises a controller 21, a sending circuit 22, a transmitter/receiver 23, and a signal discriminator 24.

The controller 21 has means for generating a request for sending the supervisory right requirement signal according to a requirement for supervising the repeaters.

The sending circuit 22 is coupled to the controller 21. Responsive to the request from the controller 21, the sending circuit 22 sends a particular signal representative of the supervisory right requirement assigned thereto through the transmitter/receiver 23 onto the submarine cables 14 and 15 as the signals A as shown in FIG. 1.

On the Other hand, the transmitter/receiver 23 receives the supervisory right requirement signal incoming through each of the submarine cables 14 and 15 as a received signal.

The signal discriminator 24 is coupled to the transmitter/receiver 23. Responsive to the received signal from the transmitter/receiver 23, the signal discriminator 24 discriminates whether or not the received signal is equal to the particular signal. When the received signal is equal to the particular signal, the station 11 acquires a right for supervising the repeaters 17 and 18. For example, the received signal is equal to the particular signal when the address in the data region for each of these signals is the same, as well as all of the other fields as shown in FIG. 5 being the same.

When the received signal is not equal to the particular signal, the signal discriminator 24 discriminates which one of the opposite stations 12 and 13 is a source station of the received signal and delivers a return signal to the sending circuit 22. This discrimination can be performed, for example, based on the address in the data region of the received signal.

The sending circuit 22 is responsive to the return signal and sends out the received signal to the source station.

Now, referring to FIG. 3, description will be made as regards operation of the system of FIG. 2 in connection with a case where the station 11 desires acquirement of the supervisory right.

At the station 11, the controller 21 generates the request for sending the supervisory right requirement signal according to requirement of supervising the repeaters 17 and 18 (step S1).

The sending circuit 22 is responsive to the request and sends the particular signal representative of the supervisory requirement assigned thereto to opposite stations 12 and 13 through the transmitter/receiver 23 and through the submarine cables 14 and 15, respectively (step S2).

At each of the opposite stations 12 and 13, transmitter/receiver 23 receives the supervisory right requirement signal incoming through the submarine cables 14 and 15 as a received signal (steps S'3 and S"3).

The signal discriminator 24 in each of stations 12 and 13 discriminates whether or not the received signal is sent from the station 11 as a source station (steps S'4 and S"4). When the received signal is transmitted from the station 11, the signal discriminator 24 delivers a return signal to the sending circuit 22 in each of the stations 12 and 13.

The sending circuit 22 in each of the stations 12 and 13 is responsive to the return signal and sends the received signal as the specific signal B in FIG. 1 to the station 11 (steps S'5 and S"5).

At the station 11, the transmitter/receiver 23 receives the specific signal from each of the stations 12 and 13 as a received specific signal (step S6).

The signal discriminator 24 in the station 11 discriminates whether or not the received specific signal in equal to the particular signal (step S7). When the specific signal is equal to the particular signal, the station 11 acquires a right for supervising the repeaters 17 and 18.

In FIG. 3, a term "flag" is used for the terms "the supervisory right requirement signal" for the purpose of simplification of the figure.

The above mentioned description of operation of the system in FIG. 2 is similarly applicable to another case where another one of stations 12 and 13 desires to acquire the supervisory right.

In the embodiment described above, when a plurality of stations require the supervisory right for repeaters at the same time, that is, when there occur collision of supervisory right requirement signals from different stations as requiring stations, it cannot be determined which one of the requiring stations acquires the supervisory right, so that operation of the system is confused.

In another embodiment of the present invention, stations 11, 12, and 13 in the system of FIG. 1 have different priority levels for the supervisory right acquirement, in order to avoid the confusion by the collision. For example, station 11 has a priority level higher than stations 12 and 13, station 12 has a priority level higher than station 13, and station 13 has the lowest priority level. Each of the stations 11, 12, and 13 has a priority determinator, as shown in FIG. 4.

Referring to FIG. 4, each of the stations (only station 11 is representatively shown in the figure) is similar to each of the stations shown in FIG. 2, but further comprises a lookup table 25 for storing information of the priority levels of stations for the repeaters, that is, the priority data. The priority determinator 26 is connected to the lookup table 25 and the controller 21.

Accordingly, the operation of the station in FIG. 4 is similar to each of stations 11, 12, and 13 in FIG. 2, but further has priority confirmation steps.

Description will be made as to the priority confirmation in the station 11 when the requirement of supervising the repeaters 17 and 18 generates at the station 11. Upon the requirement, the controller 21 checks whether or not the signal discriminator 24 discriminates the supervisory right requirement signal from any other stations 12 and 13. When the controller 21 confirms that the signal discriminator 24 discriminates no supervisory right requirement signal from the other stations, the controller 21 generates the request for sending the supervisory right requirement signal and supplies the request to the sending circuit 22. On the other hand, when the controller 21 confirms that the signal discriminator 24 discriminates the supervisory right requirement signal from at least one of the other stations 12 and 13 as a source station, the controller 21 supplies the address of the source station to the priority determinator 26. The priority determinator 26 checks the lookup table 25 and determines which one of the station 11 and the source station has the higher priority level. Since the source station is the station 12 or 13, the priority determinator 26 determines that the station 11 has the higher priority level than the source station in the example described above. In response to the determination by the priority determinator 26, the controller 21 supplies the request to the sending circuit 22 and supplies to the signal discriminator 24 a stop signal for stopping to deliver the return signal. Thus, the supervisory right requirement signal from the source station is not returned to the source station. Therefore, the source station 12 or 13 cannot acquire the supervisory right.

Then, the station 11 sends out the particular signal as the supervisory right requirement signal to the stations 12 and 13. Each of the stations 12 and 13 receives the particular signal and carries out the priority confirmation steps in the similar manner described above. Since stations 12 and 13 are lower in the priority level than the station 11 in the present example, each of the stations 12 and 13 returns the particular signal as the return signal to the station 11. Thus, the station 11 can acquire the supervisory right.

When there is no requirement of supervising of the repeaters 17 and 18 at the station 11, the controller 21 allows the signal discriminator 24 to deliver the supervisory right requirement signal received from the source station as return signal to the source station. If the source station is station 12, the source station receives the return signal from station 11 and can also receive the return signal from station 13 because the station 12 is higher in the priority level than the station 13. Therefore, the station 12 can acquire the supervisory right. If the source station is station 13, when the source station receives the return signal from station 11 and also receives the return signal from station 12 without collision with requirement from the station 12 because the station 13 is lower in the priority level than the station 12.

As described above, when any one of stations 11–13 sends out the supervising right requirement signal during the neutral condition of the supervisory right, it can acquire the supervisory right if there is no collision with the requirement from other stations. When there is collision of requirement from two or more stations, the station having the highest priority level in the stations colliding can acquire the supervisory right.

Referring to FIG. 5, the supervisory right requirement signal is shown as a digital data signal having a format 30 which comprises a first region 31 for carrying a start-of-text character, a second region 32 for carrying data, a third region 33 for carrying a check sum, a fourth region 34 for carrying a carriage return, and a fifth region 35 for carrying a line feed. The last region 36 is for carrying an end of transmission region. When a particular one of station transmits the supervisory right requirement signal, the particular station makes the supervisory right requirement signal having a station address assigned to the particular station in a preassigned byte position (as shown at 40) in the data region 32.

The particular signal A in the system of FIG. 2 can have the similar signal format as shown in FIG. 5.

The present invention has been described in connection with the submarine cable communication network system having three stations. However, it will be understood that the present invention is applicable to the system having more than three stations.

What is claimed is:

1. A method of transferring a supervisory right requirement signal in a submarine cable communication network system comprising a plurality of stations being connected with each other, in a loop, through submarine cables including repeaters, each one of said stations sending out, as a particular station, the supervisory right requirement signal to the other ones of said stations as opposite stations, when the particular station desires to obtain a supervisory right of the repeaters, the method comprising steps of:

said particular station transmitting a particular signal representative of the supervisory right requirement assigned thereto to said opposite stations through said submarine cables extending from said particular station;

each of said opposite stations receiving said particular signal as a received particular signal and discriminating from said received particular signal that the particular signal being transmitted is from said particular station and returning the received particular signal to the particular station as a specific signal when each of said opposite stations accepts that said particular station acquires the supervisory right; and said particular station receiving said specific signal from each of said opposite stations as a received specific signal and determining that the received specific signal is equal to said particular signal to acquire the supervisory right for said repeaters included in the submarine cables.

2. A system for transferring a supervisory right requirement signal in a submarine cable communication network system comprising a plurality of stations being connected with each other, in a loop, through submarine cables including repeaters, each one of said stations sending out, as a particular station, the supervisory right requirement signal to the other ones of said stations as opposite stations, when the particular station desires to obtain a supervisory right of the repeaters, wherein each of said stations comprises:

means for generating a request for sending the supervisory right requirement signal according to requirement of supervising said repeaters;

first sending means coupled to said generating means and responsive to said request for sending a particular signal representative of said supervisory requirement assigned thereto to said opposite stations through said submarine cables;

first receiving means coupled to said each of said submarine cables for receiving a specific signal from each of said opposite stations as a received specific signal; and first discriminating means coupled to said first receiving means and responsive to said received specific signal for discriminating whether or not said received specific signal is equal to said particular signal, said particular station acquiring a right for supervising said repeaters when said specific signal is equal to said particular signal;

second receiving means coupled to one or more submarine cables for receiving the supervisory right requirement signal incoming through said one or more .I submarine cables as a received signal;

second discriminating means coupled to said second receiving means and responsive to said received signal for discriminating whether or not said received signal is sent from said particular station, said second discriminating means producing a return signal when said received signal is transmitted from said particular station and when each of said opposite stations accepts that said particular station acquires the supervisory right; and second sending means coupled to said second discriminating means and responsive to said return signal for sending said received signal as said specific signal to said particular station.

3. A station for use in a submarine cable communication network system wherein a plurality of stations are connected to each other, in a loop, through submarine cables including repeaters, each one of said stations sending out, as a particular station, the supervisory right requirement signal to other ones of said stations as opposite stations, when the particular station desires to obtain a supervisory right of the repeaters, said station comprising:

means for generating a request for sending the supervisory right requirement signal according to a requirement for supervising said repeaters;

sending means coupled to said generating means and responsive to said request for sending a particular signal representative of said supervisory right requirement assigned thereto to said opposite stations through said submarine cables;

receiving means coupled to said each of said submarine cables for receiving the supervisory right requirement signal incoming through said each submarine cable as a received signal; and discriminating means coupled to said receiving means and responsive to said received signal for discriminating whether or not said received signal is equal to said particular signal, said particular station acquiring a right for supervising said repeaters when said received signal is equal to said particular signal, said discriminating means discriminating which one of said opposite stations is a source station of said received signal when said received signal is not equal to said particular signal and producing a return signal when accepting that said source station acquires the supervisory right;

said sending means coupled to said discriminating means and responsive to said return signal for sending said received signal to said source station.

4. A system claimed in claim 2, wherein each of station further comprises:

said request generating means coupled to said discriminating means for checking said discriminating means before generating the request, said request generating means generates a priority check signal when said discriminating means discriminates the source station of said received signal which is not equal to said particular signal, said priority check signal having a station address of said source station;

lookup table for storing priority data representing different priority levels different stations for supervisory right acquirement;

priority determination means coupled to said lookup table and said request generating means and responsive to said priority check signal for referring to said priority data in said lookup table and determining which is higher, the priority level of said source station or the own priority level, to produce a determined signal;

said request generating means generates said request when the own priority level is higher than said source station and stops said discriminating means from producing said return signal, said request generating means stops generating said request when the own priority level is lower than said source station and allows said discriminating means to produce said return signal said request said signal.

* * * * *